(12) United States Patent
Klein et al.

(10) Patent No.: US 8,503,370 B2
(45) Date of Patent: *Aug. 6, 2013

(54) SITE BASED MEDIA STORAGE IN A WIRELESS COMMUNICATION NETWORK

(75) Inventors: Robert Klein, Manchester, CT (US); Arthur Brisebois, Cumming, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/555,762

(22) Filed: Jul. 23, 2012

(65) Prior Publication Data

US 2012/0287858 A1    Nov. 15, 2012

Related U.S. Application Data

(63) Continuation of application No. 12/639,766, filed on Dec. 16, 2009, now Pat. No. 8,248,931.

(51) Int. Cl.
  *H04W 4/00*    (2009.01)
(52) U.S. Cl.
  USPC .......................................... 370/328; 709/232
(58) Field of Classification Search
  None
  See application file for complete search history.

(56) References Cited

U.S. PATENT DOCUMENTS

| | | | |
|---|---|---|---|
| 6,810,259 B1 | 10/2004 | Zhang | |
| 2004/0143386 A1 | 7/2004 | Yoshihara et al. | |
| 2004/0203630 A1* | 10/2004 | Wang | 455/414.1 |
| 2006/0111106 A1 | 5/2006 | Moon et al. | |
| 2008/0155059 A1 | 6/2008 | Hardin et al. | |
| 2008/0195686 A1 | 8/2008 | Son et al. | |
| 2008/0225779 A1* | 9/2008 | Bragiel et al. | 370/328 |
| 2010/0008290 A1* | 1/2010 | Fischer | 370/328 |
| 2010/0057924 A1* | 3/2010 | Rauber et al. | 709/229 |
| 2010/0085947 A1* | 4/2010 | Ringland et al. | 370/338 |
| 2010/0128664 A1* | 5/2010 | Denny et al. | 370/328 |
| 2011/0107379 A1 | 5/2011 | Lajoie et al. | |

OTHER PUBLICATIONS

Office Action dated Jan. 10, 2012 for U.S. Appl. No. 12/639,766, 16 pages.

Notice of Allowance dated May 22, 2012 for U.S. Appl. No. 12/639,766, 10 pages.

* cited by examiner

*Primary Examiner* — Min Jung

(74) *Attorney, Agent, or Firm* — Turocy & Watson, LLP

(57) ABSTRACT

A system and methodology that facilitates efficient utilization of bandwidth on a transmission link between a base station and a core mobility network, during content delivery is provided. Moreover, the system includes a data storage device, adjunct to, or integrated within, the base station for storing content locally. Typically, the data storage device is updated by downloading content from the core network at an optimal time. For example, content can be downloaded to the data storage device when the core network-to-base station link is idle, under utilized and/or has sufficient bandwidth for the download. On receiving a request for content from a user equipment (UE), the base station can directly deliver the content to the UE from the data storage device, over an air interface, when the requested content is locally available.

20 Claims, 10 Drawing Sheets

SITE BASED MEDIA STORAGE IN A WIRELESS COMMUNICATION NETWORK

CROSS-REFERENCE TO RELATED APPLICATIONS

This application is a continuation of U.S. patent application Ser. No. 12/639,766, filed on Dec. 16, 2009, and entitled "SITE BASED MEDIA STORAGE IN A WIRELESS COMMUNICATION NETWORK". The entirety of this application is incorporated herein by reference.

TECHNICAL FIELD

The subject disclosure relates to wireless communications and, more particularly, to reducing traffic on a capacity-limited link between a core wireless communication network and a base station.

BACKGROUND

Advances in wireless telecommunications are rapidly increasing the utilization of mobile devices that handle communication of media and data between users and providers. Typically, mobile devices have connected to mobile networks, such as a wireless wide area network (WWAN) over an air interface by employing a wireless connection (e.g. 2G/3G/3.5G/4G). With evolution of wireless communication, the throughput capabilities of the air interface continue to dramatically increase, leading to a capacity bottleneck at a link between the core infrastructure and the base station.

As the demand on this link has grown, additional links, such as fiber optic lines (e.g., T-1s) have been added between the base station and the core network. However, this conventional approach is very expensive to a wireless service provider. Alternately, a Digital Signal 3 (DS-3) line can added between the base station and the core network, to increase bandwidth when demand is extremely high. Generally, when more than a specified number of T-1s are required to satisfy demand, it is more cost efficient to replace them with a full DS-3, which is also a high cost to the wireless service provider. Moreover, traditional wireless network air interface capabilities provide for a single user to demand the bandwidth of multiple T-1s (e.g., 7.2 Mbps, which is approximately the bandwidth provided by six T-1s). Thus, the above conventional approach for servicing high bandwidth data demands of subscribers proves to be extremely expensive.

Further, bandwidth utilization varies based on the type of application. For example, applications, such as, e-mail or web-browsing are not as demanding as some constant-throughput demanding applications, such as, streaming video, audio, etc. As demand for multimedia applications increases, the strain to reliably transfer the content between the application server and the end user increases. Compounding this issue is the fact that the demand for this content is in real-time, so any delays in transmission are perceivable to the end user. Accordingly, bandwidth utilization in the traditional approaches is inefficient and can negatively impact performance and customer satisfaction.

DETAILED DESCRIPTION

Figure 1:
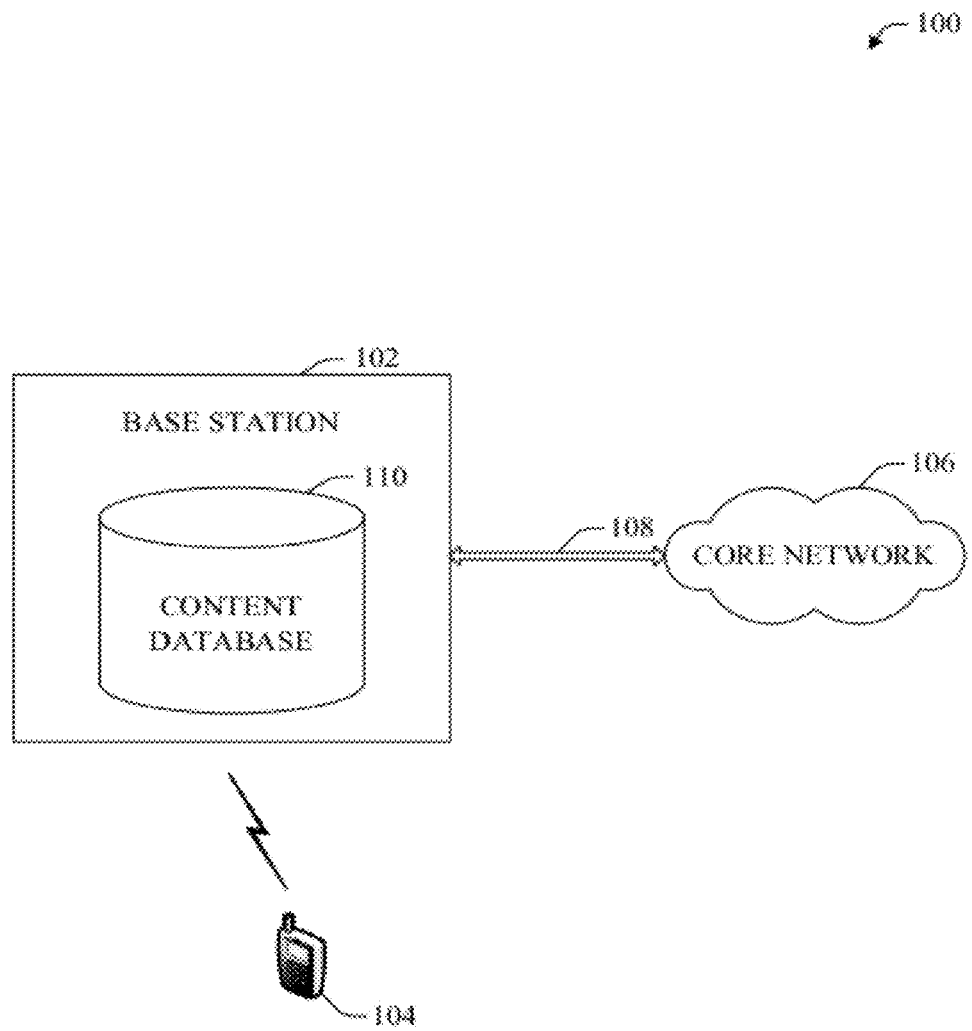
FIG. 1 illustrates an example system that facilitates storage of content at a base station in a wireless communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "station," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "end device," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, terms "core network", "core mobility network", "service provider network" and the like are employed interchangeably throughout the subject specification, unless context warrants particular distinction(s) among the terms.

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate storing frequently requested content in a storage element at a base station. In particular, a content database, adjunct to and/or integrated within the base station can be employed to receive and store content downloads from a core mobility network. According to one aspect, the content can be downloaded during periods of time when a link between the core network and base station is not busy. For example, the content can be downloaded periodically each night and/or dynamically during low traffic periods during the day. Moreover, the content database can facilitate reduction of load on the link due to the increased capacity of the air interface and can be capable of briefly buffering user data, which is sent from the core network towards a user equipment, if the air interface data capacity is temporarily limited.

In accordance with another aspect, a content retrieving component can be employed that can facilitate determining location of content requested by a user equipment (UE) attached to the base station. Moreover, the content retrieving component can lookup the local content database before requesting content from the core network. If the requested content resides in the content database, the content retrieving component can pull the content from the content database can deliver it to the UE over the air-interface, instead of requesting the content from an applicable application server and receiving the content across the core network-to-base station link. In one aspect, information pertaining to the delivery of content directly from the content database (e.g., without accessing the core network) can be sent from the base station to the core network for billing/accounting/monitoring purposes.

Yet another aspect of the disclosed subject matter relates to a method that can be employed to efficiently utilize bandwidth of a transmission link between a base station and a core mobility network. The method comprises receiving a request for content (e.g., audio, video, data, multimedia, etc.) from a UE, attached to a base station. Further, it can be determined whether the requested content is available in a local database at the base station. If the content has been previously downloaded into the local database, the content can be directly delivered to the UE over the air interface. Alternately, if the content is not available locally, a request can be sent to the core network for retrieving the content over the core network-to-base station link and the retrieved content can be delivered to the UE.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

As air interface throughput capabilities of third and later generation wireless networks continue to increase, the bandwidth between the core infrastructure and the base station is becoming a capacity bottleneck. Further, as demand for multimedia applications increases the strain to transfer multimedia content between an application server and the end user also increases. In addition, the demand for content is typically in real-time and so any delays in transmission are perceivable to the end user. The subject innovation employs a system that provides a data storage device adjunct to, or integrated within, the base station for storing most frequently accessed media content (e.g., contents of Cellular Video clips) as well as any on-demand multimedia content (e.g., most popular Internet videos or on-demand movies).

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates storage of content at a base station 102 in a wireless communication network, in accordance with an aspect of the subject system. Typically, base station 102 can be most any wireless network component or appliance that serves and receives data, control, voice, video, sound, gaming, or substantially any data-stream or signaling-stream from a set of user equipments (UEs), for example UE 104. Moreover, base station 102 can be a gateway between most any wired network and wireless communication network and is not limited to gateway within a Global System for Mobile communications (GSM) or within a Universal Mobile Telecommunications System (UMTS) network. It can be appreciated that base station 102 can be an access point, Node B, evolved Node B, home Node B (HNB), a femto access point (FAP) or the like, based on the mobile communication technology utilized.

Generally, base station 102 can connect to a core network 106 via most any transmission link 108. As an example, the link 108 can be a fiber optic cable, such as but not limited to one or more T-1 lines. The link 108 can utilize most any protocol and can carry both user data (e.g., user plane) and signaling (e.g., control plane) between the base station 102 and core network 106. According to an aspect, the system 100 can include a content database 110 that can store downloads from the core network 106 of most any media content, such as but not limited to, audio files, video clips, etc. In one aspect, the media content can be downloaded during periods of time when the link 108 is underutilized. As an example, the base station 102 can download, new media clips, most popular content, breaking news content, most-viewed audio/video clips, etc. In one example, the downloads, stored at the content database 110, can typically be most any publicly accessible and/or non-personal data that can be requested by most any UE attached to base station 102. For example, personal data, such as but not limited to, emails, is typically not stored at the content database for security purposes. Additionally, data stored in the content database can be encrypted and/or protected, by utilizing most any encryption mechanism, such that unauthorized removal of the content database 110 from the base station 102 would render the data therein useless. Additionally, data stored in the content database 110 can be subject to digital rights managagement and/or pertinent per-use billing, authorization, and/or information exchange.

Although the content database 110 is depicted to reside within base station 102, it can be appreciated that the content database 110 can be external to the base station 102. For example, the content database 110 can be externally connected to the base station 102 by a local wired and/or wireless network. Further, it can be appreciated that the content database 110 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Typically, a UE 104 can utilize most any attachment procedure to connect with base station 102, when the UE 104 is within the coverage area of the base station 102. Typically, the UE 104 as disclosed herein can include most any wireless communication device employed by a subscriber, such as, but not limited to, a cellular phone, a personal digital assistant (PDA), a laptop, a personal computer, a media player, a gaming console, and the like. Further, it can be appreciated the UE 104 can be mobile, stationary, and/or have limited mobility. In one aspect, UE 104 can request for content from the core network 106. The base station 102 can receive the request from the UE 104, lookup the content database 110, and directly deliver the content over the air interface, if the requested content resides in the content database 110. Thus, only in the case that the requested content is not within the content database 110, when the request is received, would the content be retrieved over the link 108. Accordingly, the bandwidth of link 108 can be efficiently utilized and traffic congestion can be reduced. Further, in one example, the content database 110 at the base station 102 can be an external hard drive, which is an inexpensive (e.g., less than $200 USD for 1 TB) alternative for network service providers and thus the cost for reducing congestion in the link 108 can be minimal as compared to conventional approaches.

According to one aspect, the delivery of content directly from the content database 110 can reduce the latency of the data transmission, since the content is already at the base station 102. Further, the content database 110 can also be utilized to buffer data, received from the core network 106 for UE 104, if the air interface data capacity is limited. In one embodiment, if the content is delivered directly from the content database 110, information, such as but not limited to, what the user downloaded including whether it is subscription content, the size of the download, etc. can be sent from the base station 102 to the core network 106 for monitoring, billing and/or accounting purposes. In one aspect, one or more elements of core network 106 can facilitate tracking of content stored at various base stations (not shown). As an example, a centralized node location (e.g., Radio Network Controller (RNC) and/or Serving GPRS Support Node (SGSN) in UMTS) can be employed for tracking and/or determining content that can be sent to the content database 110.

In one example, if a user, employing UE 104, has begun content download from local storage at one cell site (e.g., downloading content at UE 104 from content database 110), the user can seamlessly resume download from a local or remote storage at a disparate cell site (e.g., neighboring cell site), if the user (e.g., UE 104) is mobile. In this example scenario, one or more download progress indications can be employed and exchanged in order to determine the download re-start point when the UE 104 arrives at the disparate (e.g., neighboring) cell site. In one aspect, the progress indications can be exchanged between the UE 104 and the new cell site (not shown) and/or exchanged between the old and new cell sites over most any network interface. For example, if a new cell site has acquired a subscriber (e.g., UE104) with an in-progress media download session, the new cell site (e.g., new base station) can identify if that content is available in a local storage or not. If the content is already stored locally, delivery can resume from local storage. If the content at the new cell site is not locally stored, delivery can resume from most any central location (e.g., central media storage in the core network 106).

Typically, when resuming content delivery to the acquired subscriber, the new cell site can also store delivered media segments in local memory. Moreover, after delivering and storing content segments for acquired subscribers, the cell site can download the remaining segments from the central media storage. This prepares the cell site for subsequent requests of the same content: in its entirety: by native subscribers already served. In one aspect, speed detection can be deployed to identify the optimal content delivery method. For example, if determined that a UE is traveling at high speeds, many cell changes are likely. In this case, traditional download from a core network location can be most efficient. Alternately, if determined that the UE is stationary or traveling at low speeds, site-based media download is optimal.

Figure 2:
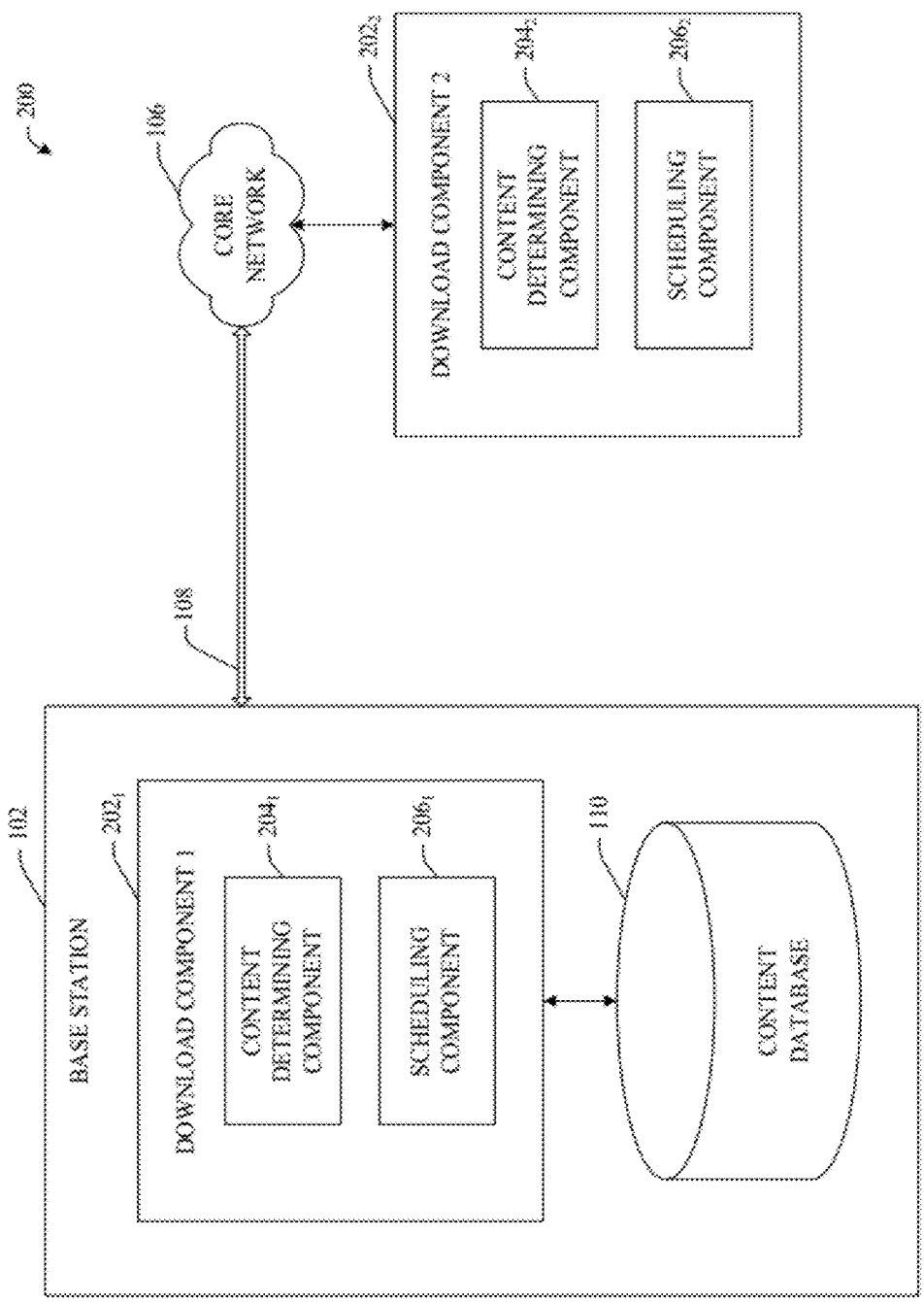
FIG. 2 illustrates an example system that can be employed for downloading content to a local storage device of a base station in accordance with an aspect of the subject disclosure.

Referring to FIG. 2, there illustrated is an example system 200 that can be employed for downloading content to a local storage device of a base station 102 in accordance with an aspect of the subject disclosure. It can be appreciated that the base station 102, link 108, core network 106 and content database 110 can include respective functionality, as more fully described herein, for example, with regard to system 100.

As described above, the content database 110 can be employed to store content that is most likely to be accessed, such as, but not limited to most frequently accessed media (e.g., contents of latest and/or most-viewed Cellular/Mobile Video clips from the wireless service provider) as well as any on-demand multimedia content (e.g., most popular Internet videos, songs, and/or on-demand movies). In another example, content database 110 can also store full-movies, on-demand downloads, and/or non real-time television shows. In one aspect, a download component ($202_1$ and/or $202_2$) can be employed to facilitate content delivery to the content database 110. As seen from FIG. 2, the download component 202 can reside within the base station 102 (e.g., download component 1, $202_1$) and/or can be a central component that resides within the core network 106 (e.g., download component 2, $202_2$). Typically, the download component ($202_1$ and/or $202_2$) can facilitate download of content from a server (not shown) on the core network 106 to the content database 110. It can be appreciated that the content database 110 can be internally or externally connected to the base station 102.

In one aspect, a content determining component ($204_1$ and/or $204_2$) can be employed to determine the content, for example, audio, video, multimedia, etc. to be downloaded to content database 110. For example, the content determining component ($204_1$ and/or $204_2$) can select content based in part on popularity of the content, number of views by a subscriber connected to the base station 102 and/or disparate subscribers, a time stamp associated with the content (e.g., latest content, such as but not limited to news clips), user preferences and/or service provider preferences, etc. In one example, the content determining component $204_1$, can determine content to be downloaded based in part on most requested content by UEs attached to the base station 102, location specific content associated with location of the base station 102 and/or UEs attached to the base station 102, based on the current time or event at the base station 102, based on a number and/or type of UEs attached to the base station 102, etc. In another example, content determining component $204_2$ can select content to be downloaded to various base stations (not shown) based in part on location of the base stations, time/day/date at the base stations. For example, content determining component $204_2$ can select news video clips from a specific area to the base stations serving that area.

In addition, a scheduling component ($206_1$ and/or $206_2$) can be utilized to schedule the download from an element in the core network 106 to the content database 110. Moreover, the scheduling component ($206_1$ and/or $206_2$) can schedule downloading the content selected by the content determining component ($204_1$ and/or $204_2$) during a period of time when the link 108 is underutilized. In one aspect, the scheduling component ($206_1$ and/or $206_2$) can determine the traffic on the link 108 can schedule a download at most anytime when traffic on link 108 is below a pre-defined threshold, such that traffic congestion is avoided. For example, the scheduling component ($206_1$ and/or $206_2$) can specify content to be downloaded overnight and/or dynamically during low traffic periods during the day. In another example, the scheduling component ($206_1$ and/or $206_2$) can request a download periodically, on-demand, when link 108 is idle, and/or based on a user-defined and/or network provider-defined policy.

Accordingly, updated content can be stored at the content database 110. In one example, the content database 110 can utilize most any replacement algorithms, such as but not limited to, a least recently used (LRU) and/or First-in-first-out (FIFO), algorithm for updating content. Moreover, the least frequently requested content and/or the last requested content, within the content database 110 can be replaced with the newly downloaded content. Thus, the content database 110 can typically contain content that is most likely to be requested by a UE attached to the base station 102. Moreover, when UE requested content, resides on the content database 110, the content can be sent over the air interface to the UE, directly from the content database 110. Thus, a faster response time can be achieved and latency can be reduced since the content is already available at the base station 102.

Figure 3:
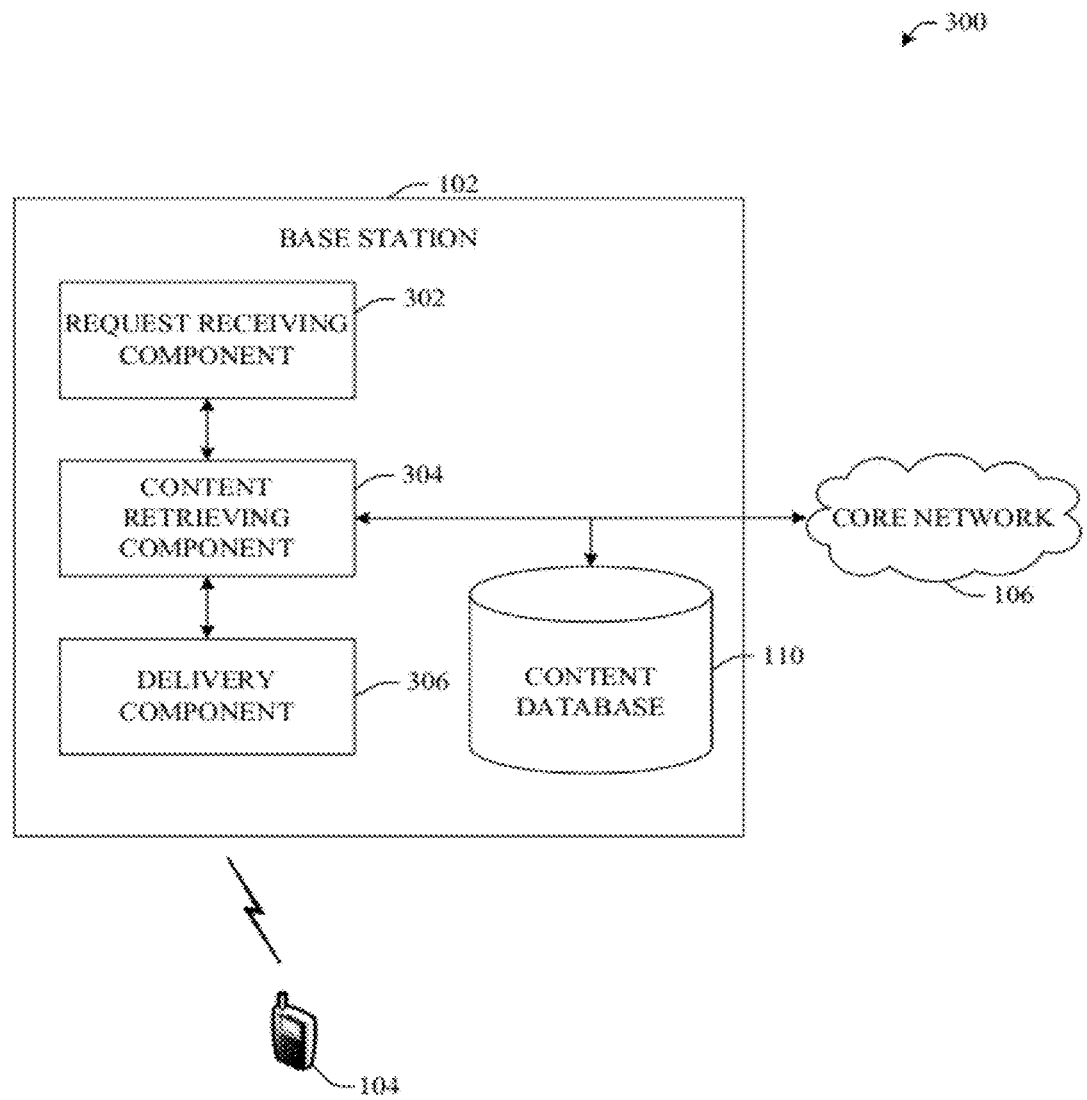
FIG. 3 illustrates an example system that can be employed to facilitate efficient content delivery in wireless communication systems.

Referring now to FIG. 3, there illustrated is an example system 300 that can be employed to facilitate efficient content delivery in wireless communication systems, according to an aspect of the subject disclosure. It can be appreciated that the base station 102, UE 104, core network 106 and content database 110 can include respective functionality, as more fully described herein, for example, with regard to systems 100 and 200. In one aspect, the content database 110 can be located within the base station 102. However, the subject application is not so limited and as noted previously, the content database 110 can reside completely, partially, and/or be distributed between, base station 102 and a local network (not shown).

In one embodiment, a UE 104 can attach to the base station 102 for communication, when the UE 104 is within the coverage area of the base station 102. Typically, the UE 104 can communicate with the base station 102 over the air interface to request for content from an application server (not shown) in the core network 106. As mentioned previously, UE 104 can include most any electronic device that can connect wirelessly to the base station 102, such as, but not limited to, a mobile phone, media player, digital camera, media recorder, laptop, PDA (personal digital assistant), personal computer, MP3 player, printer, scanner, digital photo frame, GPS module, gaming module, etc. According to an embodiment, a request receiving component 302 can receive a request sent by UE 104 for content download onto the UE 104.

In one aspect, a content retrieving component 304 can be employed to determine a location of the requested content.

For example, the content retrieving component 304 can lookup the content database 110 to determine whether the requested content is locally available. If the content exists within the content database 110, a delivery component 306 can be employed to transmit the content to the UE 104 from the content database 110. Thus, communication latency to the end-user can be reduced. Alternately, if the content is not available within the content database 110, then the content retrieving component 304 can send a request to the core network 106 and receive the requested content from the core network via a transmission link. Moreover, the delivery component 306 can transmit the received content to the UE 104 over the air interface. In one example, the received content can be stored within the content database 110 for future use.

In this regard, system 300 reduces demand on the bandwidth-limited transmission link between the base station 102 and core network 106. Moreover, the content database 110 can updated (e.g. by download component 202), such that, content likely to be requested by the UE 104 can be available at the base station 102. Further, since the updates to the content database 110 can be made during low traffic periods on the link between core network 106 and base station 102, system 300 can perform more efficiently than conventional systems. In addition, utilization of the content database 110 is extremely cost effective and can save costs by deferring additions of costly T-1s and DS3s between the base station 102 and core network 106.

Figure 4:
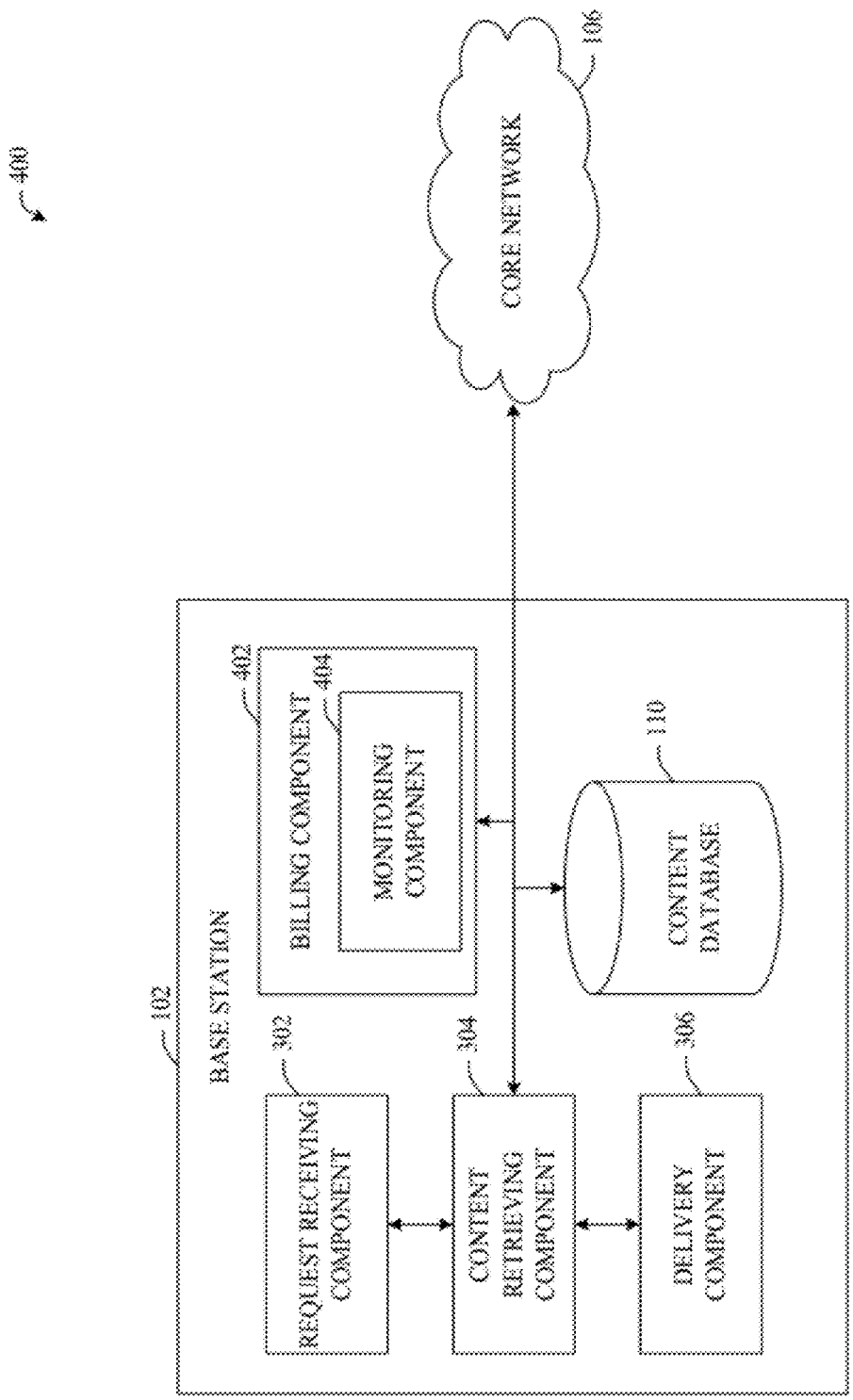
FIG. 4 illustrates an example system that provides local content delivery information to a core network in accordance with the subject innovation.

FIG. 4 illustrates an example system 400 that provides local content delivery information to a core network 106 in accordance with the subject innovation. It can be appreciated that the base station 102, core network 106, content database 110, request receiving component 302, content retrieving component 304 and delivery component 306 can include respective functionality, as more fully described herein, for example, with regard to systems 100, 200 and 300.

In an aspect, the content database 110 can be employed to locally store content, from one or more application servers (not shown) in the core network 106, at the base station 102. As an example, the request receiving component 302 can receive a request for content from a UE attached to the base station 102 and the content retrieving component 304 can identify the location of the content. Specifically, if the content is located within the content database 110, the delivery component 306 can pull the content from the content database 110 and deliver it to the UE over the air interface. In this manner, the traffic on the link between the base station 102 and core network 106 can be substantially reduced.

In particular, system 400 can include a billing component 402 that can facilitate providing information regarding local delivery to the core network 106. In one aspect, a monitoring component 404 can monitor and/or observe content delivery sessions from the content database 110. Typically, when content is delivered, for example, by the delivery component 306, to a UE over the air interface, directly from the content database 110, the monitoring component 404 can observe various factors associated with the delivery. The factors can include, but are not limited to what the user downloaded including whether it is subscription content, the size of the download, time of download, type of UE, UE identity, etc. In one aspect, the billing component 402 can send the monitored information from the base station 102 to the core network 106, via a transmission link (e.g., link 108, FIG. 1). The core network 106, can utilize the information for billing, accounting, monitoring and/or recording purposes. In one example, the billing component 402 can collect and/or aggregate the monitored information and transfer the information to the core network 106 periodically, dynamically, on demand, based on traffic conditions on the base station-to-core network link, etc.

In an example embodiment, the billing component 402 can add a flag, for example, a one-bit flag to the request received by the request receiving component 302. In particular, the flag can indicate whether the core network 106 is to send the requested content to the base station 102 or if the content is already stored locally. For example, the flag bit when set to "1" can indicate that requested content is not available in the content database 110 and thus the core network 106 should send the requested content over the link (e.g., link 108, FIG. 1). Further, the flag bit when set to "0", can indicate that the requested content has been locally delivered from the content database 110 and the core network 106 does not have to send the content to the base station 102 (or vice versa). Moreover, the billing component 402 can send the request along with the appropriate one-bit flag value to the core network 106. In this manner, an element (e.g., RNC or SGSN in UMTS) of the core network 106 can track content delivery and storage for each base station (e.g., base station 102), even when content is delivered locally. Further, in an additional aspect, the tracking information can also be utilized (e.g., by download component $202_2$) to determine whether the content in the content database 110 is to be updated.

According to an aspect, the monitoring component 404 can determine what percentage of requested media was found to be on the local storage device, for example, in terms of percentage of total requests and/or percentage of total MB. Moreover, the monitoring component 404 can report the percentage to the core network 106, which can be utilized to determine the data that should be stored on the content database 110 and/or calculate a savings in interconnect costs between base station 102 and core network 106. Additionally or alternately, the monitoring component 404 can also be employed to identify and/or store (e.g., at most any database) one or more download progress indications associated with a content download session from the content database 110 by most any UE attached to the base station 102. Moreover, if the UE, downloading content from the content database 110, attaches to a disparate base station (not shown), the monitoring component 404 can exchange and/or deliver the download progress indications to the disparate base station over the core network 106 to seamlessly handoff the content download session. In one example, the download progress indications can include, but are not limited to, an indication of a point to where content has been downloaded, a percentage of content downloaded, etc.

Similarly, when a UE that has an in-progress content download session moves from most any disparate cell site and attaches to base station 102, the monitoring component 404 can receive one or more download progress indications associated with the content download session from a disparate base station of the most any disparate cell site. In one aspect, the content retrieving component 304 can identify whether the content for the in-progress content download session is available at the content database 110 or not. Moreover, the delivery component 306 can resume the in-progress content download session from the content database 110, if determined that the content is stored locally. In particular, the in-progress content download session can be seamlessly resumed from a point where it left off based on the one or more download progress indications received by the monitoring component 404. Alternately, if determined that the content is not locally stored at content database 110, the delivery component 306 can resume the download from most any central location (e.g., central media storage in the core network 106). Whilst resuming content delivery to the UE from the central location, the base station 102 can also store delivered media segments in the content database. Moreover, after delivering and storing content segments for the UE, the base station 102 can download the remaining segments (e.g., segments previously downloaded at the disparate cell site) from the central media storage to the content database 110 for subsequent requests of the same content, for example, in its entirety, by most any disparate UE attached to the base station 102.

In one aspect, the monitoring component 404 can also detect speed and/or motion of a UE that requests content. Specifically, the content retrieving component 304 can utilize the speed and/or motion data to determine an optimal content delivery method. For example, if determined that a UE is traveling at high speeds (e.g., above a preset threshold), many cell changes are likely. In this case, a traditional download from a core network 106 can be most efficient and accordingly the requested content can be retrieved (e.g., by the content retrieving component 304) from the central media storage in the core network 106 and delivered to the UE (e.g., by the delivery component 306). Alternately, if determined that the UE is stationary or traveling at low speeds, site-based media download is optimal. Accordingly, the requested content can be retrieved (e.g., by the content retrieving component 304) from the content database 110 and delivered to the UE (e.g., by the delivery component 306). According to an aspect, although the monitoring component 404 is shown to reside within the billing component 402, it can be appreciated that the monitoring component 404 can reside most anywhere within the base station 102 or be locally or remotely connected to base station 102.

Figure 5:
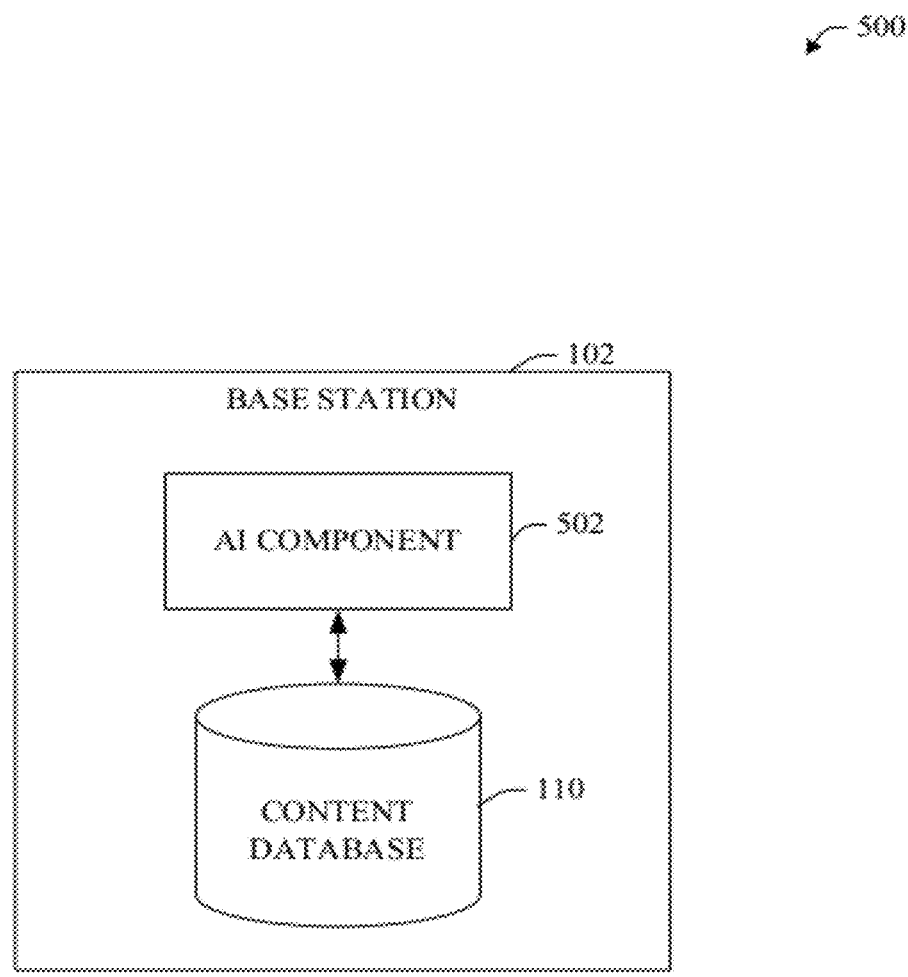
FIG. 5 illustrates an example system that facilitates automating one or more features in accordance with the subject innovation.

FIG. 5 illustrates a system 500 that employs an artificial intelligence (AI) component 502, which facilitates automating one or more features in accordance with the subject innovation. It can be appreciated that the content database 110 and base station 102 can include respective functionality, as more fully described herein, for example, with regard to systems 100, 200, 300 and 400. Further, although the AI component 502 is illustrated to reside within the base station 102, it can be appreciated that the AI component 502 can also be locally or remotely connected to the base station 102. The subject innovation (e.g., in connection with content delivery and update of the content database 110) can employ various AI-based schemes for carrying out various aspects thereof. For example, a process for determining an update to content stored in the content database 110 can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of wireless communication systems, for example, attributes can be derived from content requests and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the content database 110 can be updated, what content can be downloaded to the content database 110, how long to store the specific content within the content database 110, etc. The criteria can include, but is not limited to, resource demands, historical patterns, UE behavior, user preferences, service provider preferences and/or policies, location of the UE, location of base station 102, popularity of content, number of views for content, time when content was last viewed, network status, traffic conditions on core network-to-base station link, etc.

Figure 6:
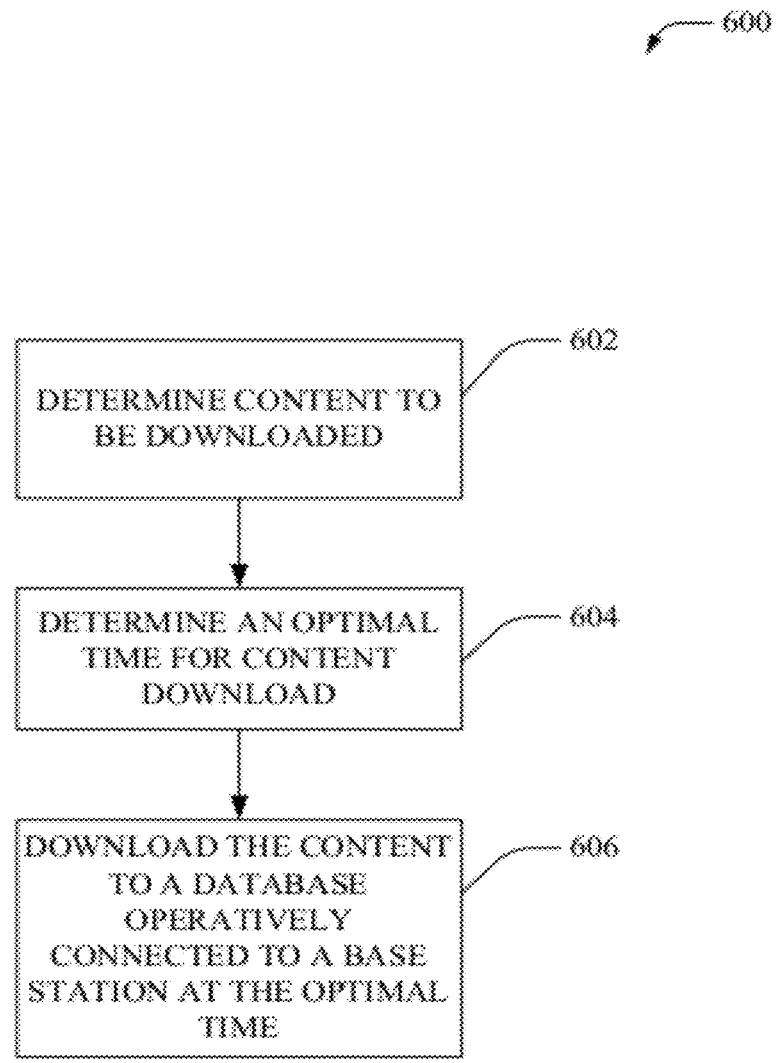
FIG. 6 illustrates an example methodology that can be utilized to facilitate storage of content at a base station during wireless communication.
Figure 7:
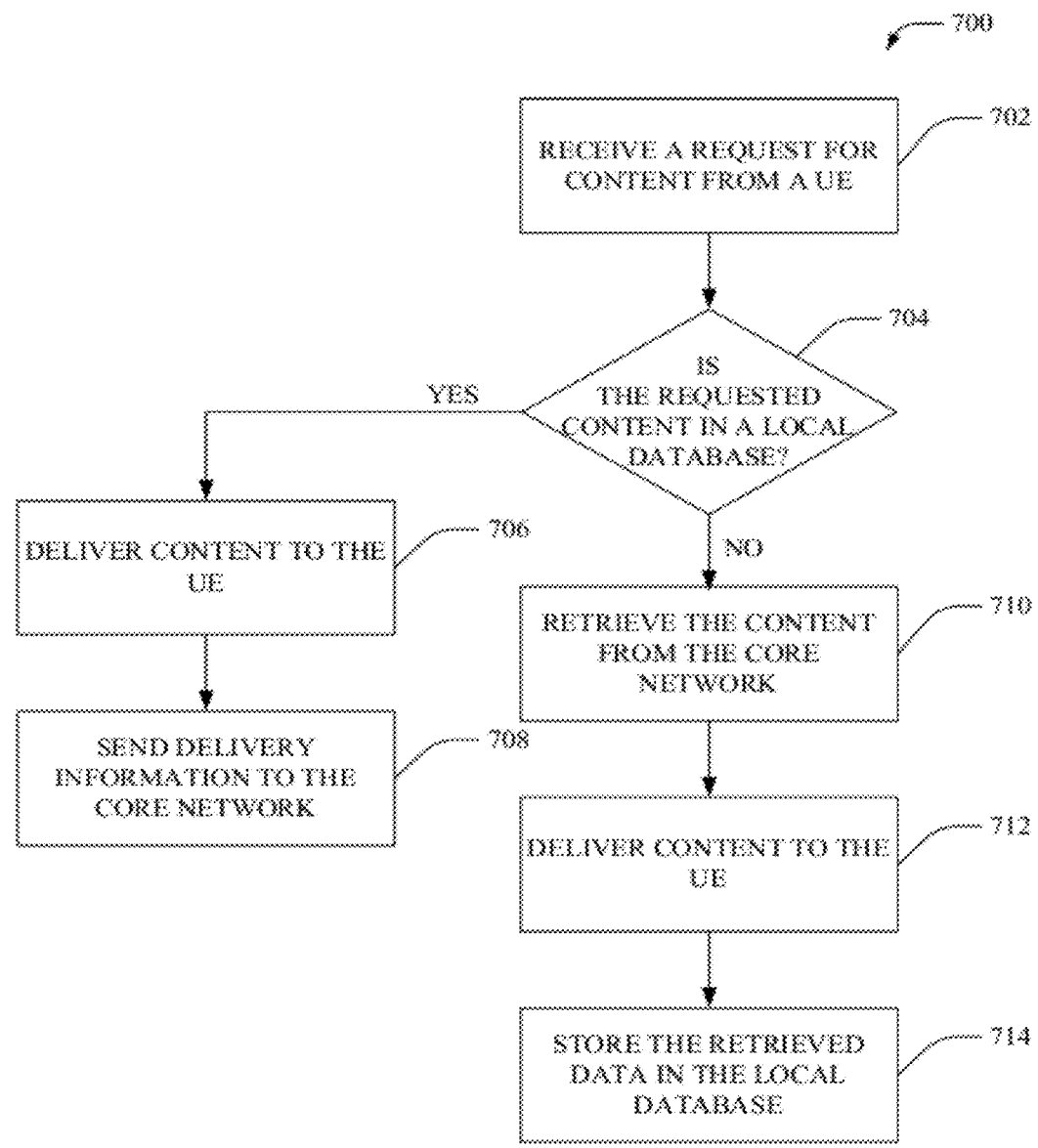
FIG. 7 illustrates an example methodology that provides a low latency and faster response time during content delivery in wireless communication.
Figure 8:
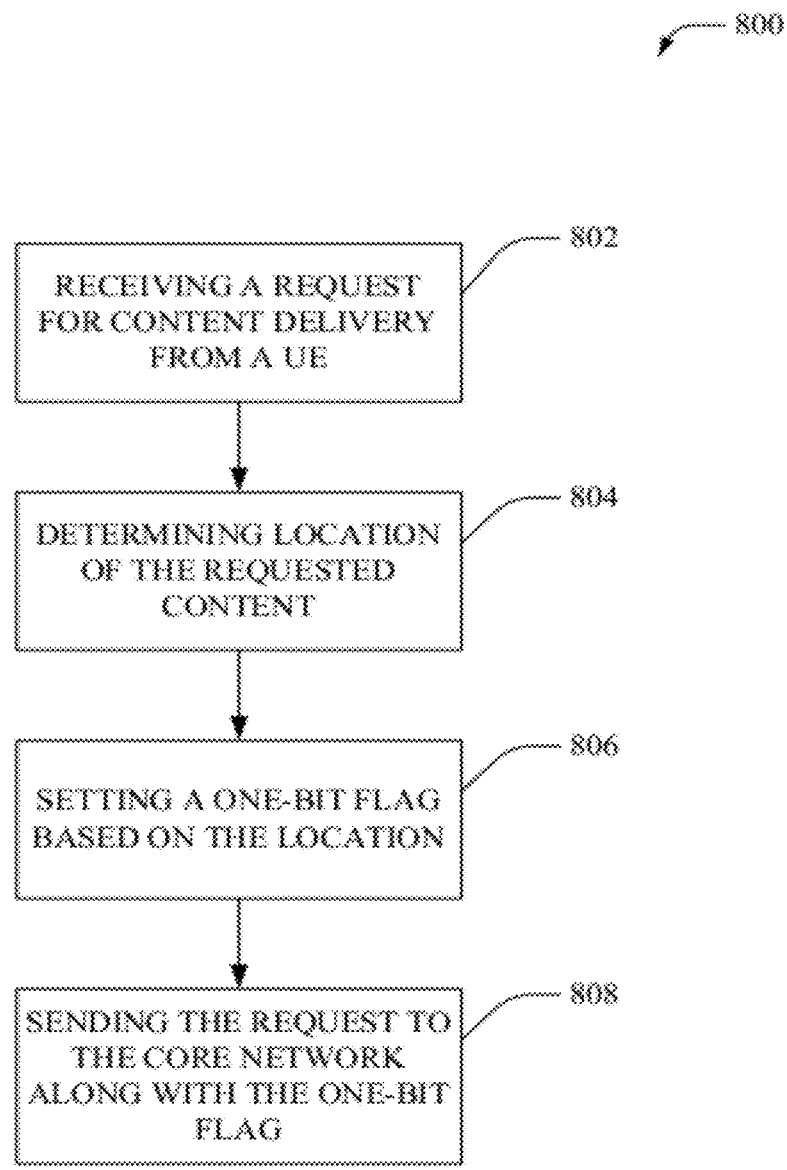
FIG. 8 illustrates an example methodology that facilitates mitigating traffic on a transmission link between a base station and a core network during content delivery.

FIGS. 6-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 6, illustrated is an example methodology 600 that can be utilized to facilitate storage of content at a base station during wireless communication in accordance with an aspect of the subject innovation. Moreover, the stored content can be accessed by most any UE attached to the base station without utilizing resources of the core network and/or the core network-to-base station link for content delivery. Typically, the content can be downloaded beforehand, for example, during periods of time when the core network-to-base station link is underutilized. In this regard, at 602, the content to be downloaded can be determined. For example, the content can include but is not limited to audio clips, video clips, movies, multimedia content, etc. As an example, the determination of content can be a function of popularity of the content, a number of views by a subscriber connected to the base station and/or disparate subscribers, a time stamp associated with the content, user preferences, service provider preferences, and/or location of the base station, etc. In one example, a statistical analysis can be performed to determine the probability that a UE, attached to a base station, is likely to request for the content. If the probability is greater than a certain pre-defined threshold, the content can be selected for download to the base station.

At 604, an optimal time for content download, from the respective server in the core network to a storage adjunct to, or integrated within the base station can be determined As an example, the optimal time can be dynamically determined when the core network-to-base station link is idle, under utilized and/or has sufficient bandwidth for the download. In another example, a time for downloading content can be set by the service provider and/or a service provider policy. For example, download time can be set during nights, and/or dynamically during low traffic periods during the day. At 606, the determined content can be downloaded to the database operatively connected to the base station at the optimal time, such that the core network-to-base station link is efficiently utilized.

FIG. 7 illustrates an example methodology 700 that provides a low latency and faster response time during content delivery in wireless communication, in accordance with an aspect of the subject specification. At 702, a request for content (e.g., audio, video, data, multimedia, etc.) can be received from a UE, for example, attached to a base station. Typically, the UE can be, but is not required to be, for instance, a communication device, a multi-mode device, a dual-mode device, a dual-mode cellular/IP device, a mobile communication device, a cellular device that connects to a fixed IP network, a Smartphone, a gaming device, a home media center, a portable media player, a satellite phone, a desktop device, a cellular phone, a portable gaming device, a mobile phone, a portable music player, a portable device, a laptop, a personal digital assistant, or a handheld or combinations thereof that can employ most any wireless mobile communication technology.

At 704, it can be determined whether the requested content is stored within a local database. At, 706, the content can be delivered to the UE, for example, over an air interface, if determined that the content is stored locally. Moreover, the local delivery of content can facilitate lower latency and a faster response time, in addition to reduction of traffic on a link between the base station and core network. Further, at 708, delivery information can be sent to the core network (e.g., for billing, monitoring, and/or accounting purposes). For example, the information can include but is not limited to what the user downloaded, including whether it is subscription content, the size of the download, time of download, type of UE, UE identity, etc. In one example, the received request can be forwarded to the core network along with a set one-bit flag, which can indicate that locally stored content was delivered and the core network does not have to send the requested content over the link.

Alternately, if determined that the requested content is not within the local database, at 710, content can be retrieved from the core network, for example, over a transmission link between the core network and the base station. In one example, the received request can be forwarded to the core network along with a reset one-bit flag, which can indicate that content is requested from the core network over the link. At 712, the retrieved content can be delivered to the UE over the air interface. In an optional aspect, at 714, the retrieved content can be stored at the local database for future requests. It can be appreciated that the local database can typically store media, which is non-personal in nature (e.g., no e-mails) and of most any type of data that can be requested by most any user (e.g., public information). In addition, copyrighted media, such as but not limited to, movies, song, etc., stored in the local database, can be encrypted and/or protected such that removal of the local database from the base station would render the media useless.

FIG. 8 illustrates an example methodology 800 that facilitates mitigating traffic on a transmission link between a base station and a core network during content delivery, according to an aspect of the subject disclosure. At 802, a request for content delivery can be received from a UE. For example, the UE can be most any wireless communication device attached to the base station. At 804, the location of the requested content can be determined. In one aspect, a local database can be looked up to identify whether the requested content is locally available or not.

At 806, a one-bit flag can be set based in part on the determined location. For example, if the requested content is locally available, the flag can be set to "1" and if the requested content is not locally available, the flag can be set to "0", or vice versa. At 808, the request can be sent to the core network along with the one-bit flag. Moreover, when the flag indicates that the requested content is locally available, the core network does not send content over the transmission link. However, the core network utilizes the request for various purposes, such as but not limited to, billing, accounting, monitoring, recording, etc. Alternately, when the flag indicates that, the requested content is not locally available; the core network downloads content over the transmission link to the base station for delivery to the UE (e.g., over an air interface).

Figure 9:
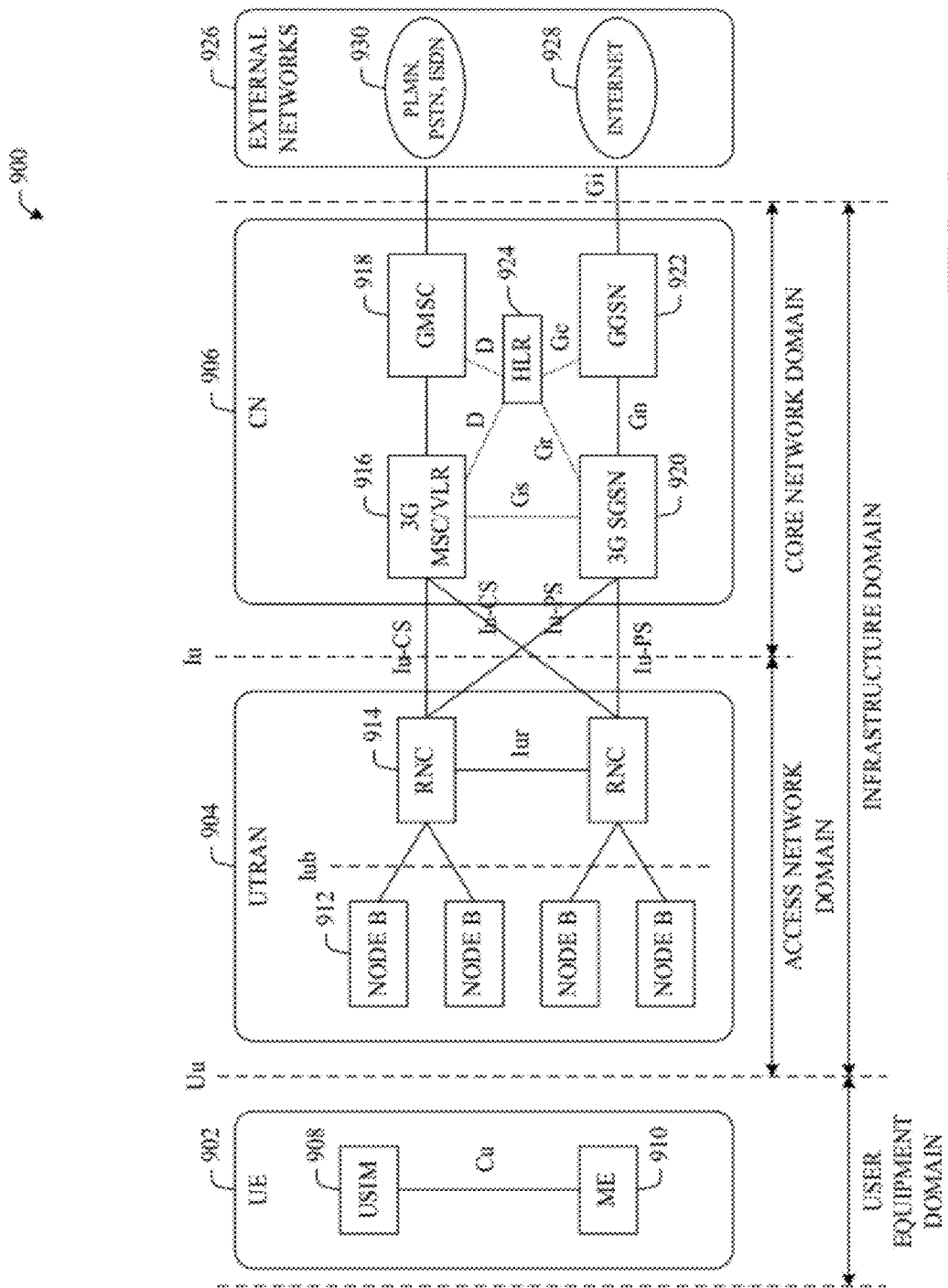
FIG. 9 illustrates an exemplary UMTS network that facilitates traffic management on transmission links between a core network and one or more base stations in accordance with the subject innovation.

FIG. 9 illustrates an exemplary UMTS network 900 that facilitates traffic management on transmission links between a core network and one or more base stations in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading). UMTS can also support have a virtual home environment, which is a concept for portability across network boundaries and between terminals in a personal service environment. Personal service environment means that users are consistently presented with the same personalized features, user interface customization and services in whatever network or terminal, wherever the user can be located. UMTS also includes network security and location based services. Content delivery from site-based storage (e.g., content database 110) is less load-sensitive and can be allocated more aggressive QoS to improve user experience. This is less practical if the content is delivered over many other network elements and transport paths: with various load and supported QoS profiles.

The UMTS network 900 can consist of three interacting domains; a user equipment (UE) domain 902, a UMTS Terrestrial Radio Access Network (UTRAN) domain 904, and a core network (CN) domain 906. The UTRAN domain 904 is also referred to as the access network domain and the CN 906 is referred to as the core network domain, the both of which comprise an infrastructure domain.

The UE domain 902 includes a USIM (user services identity module) domain and an ME (mobile equipment) domain. User equipment is the equipment used by the user to access UMTS services. In the UE domain 902, the UMTS IC card is the USIM 908, which has the same physical characteristics as GSM SIM (subscriber identity module) card. The USIM interfaces to ME 910 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 904 provides the air interface access method for the UE domain 902. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 912, and control equipment for Node-B devices is called a radio network controller (RNC) 914. The interface between the Node-B device and the RNC 914 is the IuB interface. The interface between two RNCs is called the Iur interface. According to an aspect, a database (e.g., content database 110) as described supra, can be integrated within, or operatively connected to, the Node-B device 912.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 916 and gateway MSC (GMSC) 918. Packet-switched elements include a serving GPRS support node (SGSN) 920 and gateway GPRS support node (GGSN) 922. Some network elements such as an EIR (equipment identity register) (not shown), HLR (home location register) 924, VLR and AuC (authentication center) (not shown) can be shared by both domains.

A function of the CN 906 is to provide switching, routing and transit for user traffic. The CN 906 also contains the databases and network management functions. The basic CN architecture for UMTS is based on the GSM network with GPRS (general packet radio service) capability. All equipment is modified for UMTS operation and services. The radio access network has several interfaces that can be configured and dimensioned. The CN 906 interfaces to the radio access domain via an Iu interface. An Iu-CS (circuit-switched) reference point interfaces an RNC of the access network to the MSC/VLR entity 916 of the CN 906 for voice from/to the MSC/VLR 916. An Iu-PS (packet-switched) reference point interfaces an RNC of the access network to the SGSN entity 920 of the CN 906 for data from/to the SGSN 920.

In the CN 906, a Gs interface is provided between the MSC/VLR 916 and the SGSN. A Gn interface is provided between the SGSN 920 and the GGSN 922. A D interface is provided between the MSC/VLR 916 and the HLR 924, and the HLR 924 and the GMSC 918. A Gr interface is provided between the SGSN 920 and the HLR 924. A Gc interface is provided between the GGSN 922 and the HLR 924.

The CN 906 provides the interface from the UE domain 902 to external networks 926 such as the Internet 928 via a Gi interface from the GGSN 922, and other networks 930 via the GMSC 918, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 906 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2130-2170 MHz are employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency. Frequencies 1980-2010 MHz and 2170-2200 MHz are employed for satellite uplink and downlink.

Figure 10:
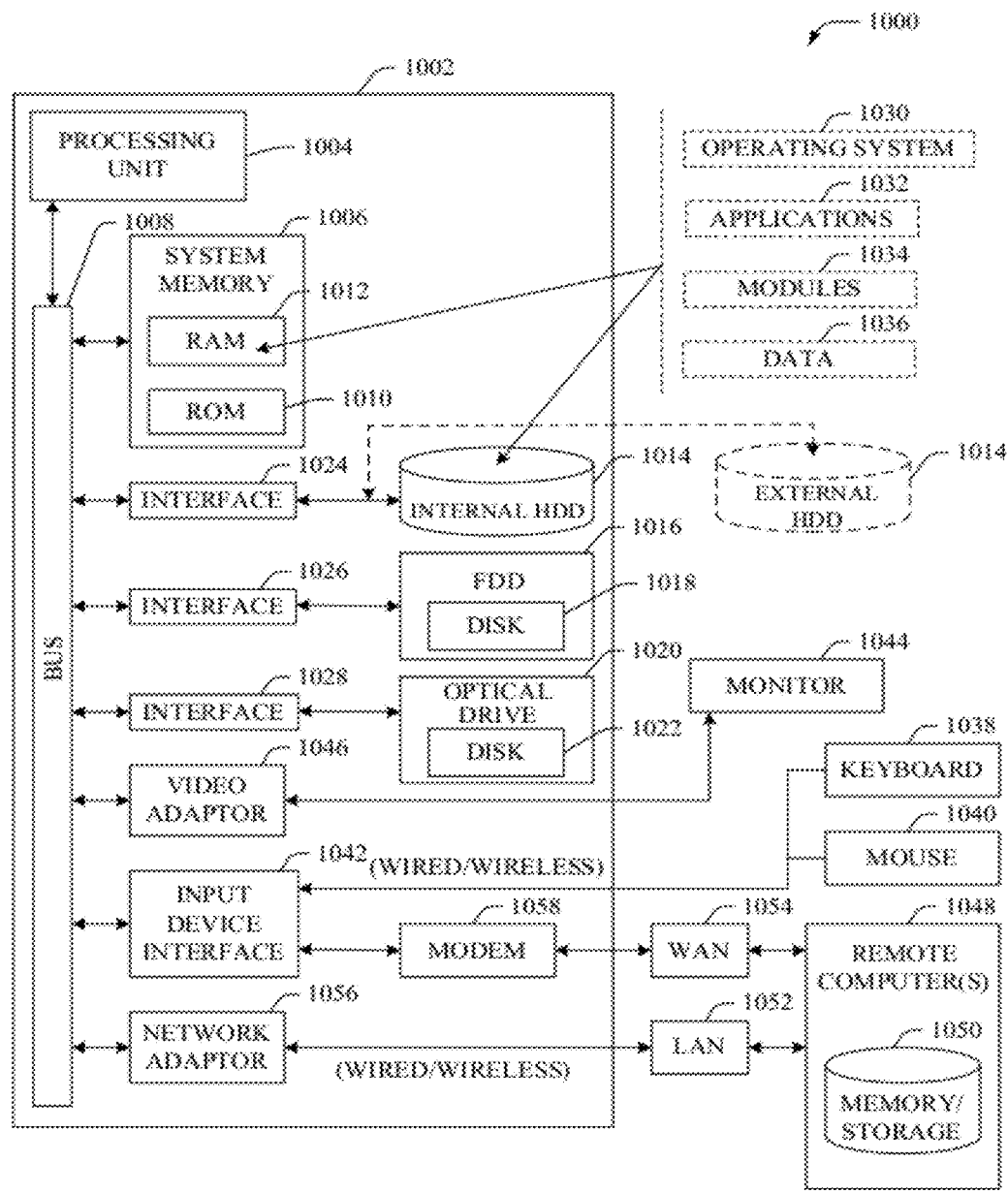
FIG. 10 illustrates a block diagram of a computer operable to execute the disclosed communication architecture.

Referring now to FIG. 10, there is illustrated a block diagram of a computer operable to execute the disclosed communication architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a user equipment comprising a processor, motion data indicative of a speed of the user equipment;

facilitating, by the user equipment, a transmission of the motion data from the user equipment to an access point device of a telecommunication network to which the user equipment is coupled; and subsequent to content from a content source device communicatively coupled to the access point device being copied to a data store of the access point device and in response to the motion data being determined to satisfy a defined speed criterion, receiving, by the user equipment, the content from the data store, wherein the content to be copied to the data store is selected from the content source device based on determining that information indicative of a timestamp that is assigned to the content satisfies a defined timing criterion.

2. The method of claim 1, wherein the content to be copied to the data store is selected from the content source device based on geographical data associated with a location of the access point device.

3. The method of claim 1, further comprising:
in response to the motion data being determined to not satisfy the defined speed criterion, receiving, by the user equipment, the content from the content source device via the access point device.

4. The method of claim 1, wherein the access point device is a first access point device and the receiving comprises:
in response to the user equipment being determined to be communicatively coupled to the first access point device, receiving, by the user equipment, a first portion of the content from the data store; and
in response to a communicative coupling of the user equipment to the first access point device being determined to be in a state of transfer to a second access point device of the telecommunication network, receiving, by the user equipment second portion of the content from the content source device via the second access point device.

5. The method of claim 1, wherein the access point is a first access point device, the data store is a first data store and the receiving comprises:
in response to the user equipment being determined to be communicatively coupled to the first access point device, receiving, by the user equipment, a first portion of the content from the first data store; and
in response to a communicative coupling of the user equipment to the first access point device being determined to be in a state of transfer to a second access point device, receiving, by the user equipment via the second access point device, a second portion of the content from a second data store of the second access point device subsequent to the second portion of the content being copied from the content source device to the second access point device.

6. The method of claim 1, wherein the transmission is a first transmission and the method further comprises:
facilitating, by the user equipment, a second transmission of request data indicative a request to download the content from the content source device to the user equipment.

7. The method of claim 1, wherein the content to be copied to the data store is selected from the content source device based on determining a number of other user equipment that are coupled to the access point device.

8. A system, comprising:
a memory to store instructions; and
a processor, coupled to the memory, that facilitates execution of the instructions to perform operations, comprising:

determining information indicative of a timestamp assigned to content stored within a content server,
in response to determining that the timestamp satisfies a defined timing criterion, facilitating a transmission of request data to download the content to a data store of a first access point device of a telecommunication network,
in response to a first determination that a coupling of a user equipment to the first access point device is not likely to be transferred from the first access point device to a second access point device of the telecommunication network, facilitating a first transfer of the content from the data store to the user equipment, and
in response to a second determination that the coupling of a user equipment to the first access point device is likely to be transferred from the first access point device to the second access point device, facilitating a second transfer of the content from the content server to the user equipment.

9. The system of claim 8, wherein the operations further comprise:
determining that the user equipment will not be transferred from the first access point device to the second access point device based on an analysis of motion data indicative of a speed of the user equipment.

10. The system of claim 9, wherein the facilitating the transmission comprises facilitating the transmission in response to determining that the content is customized for a geographic region related to the first access point device.

11. The system of claim 10, wherein the geographic region comprises a location determined for the access point device.

12. The system of claim 9, wherein the facilitating the transmission comprises facilitating the transmission in response to determining that the content is related to an event associated with geographic region.

13. The system of claim 12, wherein the operations further comprise:
receiving the content from the content server in response to determining that traffic data indicative of data transmission traffic on a backhaul link coupled to the first access point device satisfies a defined traffic criterion.

14. The system of claim 8, wherein the operations further comprise:
selecting the content in response to determining that a number of other user equipment coupled to the first the access point device satisfies a defined number criterion.

15. The system of claim 8, wherein the operations further comprise:
modifying data within the data store based on a defined replacement process.

16. A non-transitory computer-readable storage medium having instructions stored thereon that, in response to execution, cause a system comprising a processor to perform operations, comprising:
selecting content, from a content server coupled to a telecommunication network, to be downloaded to a user equipment via a first access point device in response to determining that information indicative of a timestamp assigned to the content satisfies a defined time criterion; and
subsequent to the content being copied from the content server to a data store of the first access point device, facilitating a communication of the content from the data store to the user equipment based on determining that a probability that the user equipment is not likely to be handed over from the first access point device to a second access point device of the telecommunication network satisfies a defined probability criterion.

17. The non-transitory computer readable storage medium of claim 16, wherein the operations further comprise:
determining motion data indicative of a speed of the user equipment, wherein the motion data facilitates the determining.

18. The non-transitory computer readable storage medium of claim 16, wherein the selecting comprises selecting the content based on determining number data indicative of a number of other user equipment coupled to the first access point device.

19. The non-transitory computer readable storage medium of claim 16, wherein the selecting comprises selecting the content based on determining geographical data indicative of a location of the first access point device.

20. The non-transitory computer readable storage medium of claim 16, wherein the operations further comprise:
updating data within the data store based on a least recently used replacement process.

* * * * *